US009529555B2

(12) United States Patent
Tsuchiya

(10) Patent No.: US 9,529,555 B2
(45) Date of Patent: Dec. 27, 2016

(54) IMAGE FORMING APPARATUS, AND METHOD IN WHICH OUTPUT DESTINATION OF PRINT JOB IS CHANGED ACCORDING TO WHETHER USER AUTHENTICATION IS DONE, AND PRINTING SYSTEM INCLUDING TERMINAL DEVICE AND IMAGE FORMING APPARATUS

(71) Applicant: KYOCERA Document Solutions Inc., Osaka (JP)

(72) Inventor: Masaki Tsuchiya, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/876,158

(22) Filed: Oct. 6, 2015

(65) Prior Publication Data

US 2016/0103640 A1   Apr. 14, 2016

(30) Foreign Application Priority Data

Oct. 8, 2014   (JP) ................................ 2014-207061

(51) Int. Cl.
*G06F 3/12* (2006.01)
*H04N 1/00* (2006.01)
*H04N 1/44* (2006.01)

(52) U.S. Cl.
CPC ........... *G06F 3/1222* (2013.01); *G06F 3/1238* (2013.01); *G06F 3/1267* (2013.01); *G06F 3/1274* (2013.01);
(Continued)

(58) Field of Classification Search
CPC .... G06F 3/1222; G06F 3/1267; G06F 3/1274; H04N 1/00204; H04N 1/4426
(Continued)

(56) References Cited

U.S. PATENT DOCUMENTS

| 9,229,663 B2 | 1/2016 | Yoshida |
| 2006/0092433 A1 * | 5/2006 | Stevens .............. H04N 1/00957 358/1.1 |

(Continued)

FOREIGN PATENT DOCUMENTS

| JP | 2007-168154 A | 7/2007 |
| JP | 2009-078503 A | 4/2009 |

(Continued)

OTHER PUBLICATIONS

An Office Action "Notification of Reasons for Refusal" issued by the Japanese Patent Office on Sep. 6, 2016, which corresponds to Japanese Patent Application No. 2014-207061 and is related to U.S. Appl. No. 14/876,158; with English language translation.

*Primary Examiner* — Jamares Q Washington
(74) *Attorney, Agent, or Firm* — Studebaker & Brackett PC

(57) ABSTRACT

An image forming apparatus includes an interface section, a data storage section, an input section, an authentication section, and an image forming section. The interface section receives a print job from a terminal device. The print job is assigned terminal identification information that identifies the terminal device. The data storage section stores the print job. In accordance with whether or not the authentication section positively authenticates a user before a specified time elapses from the interface section receiving the print job, the interface section outputs the print job stored by the data storage section to the image forming section or the terminal device, and the data storage section deletes the print job stored.

8 Claims, 10 Drawing Sheets

(52) U.S. Cl.
CPC .......... *G06F 3/1285* (2013.01); *H04N 1/0032* (2013.01); *H04N 1/00204* (2013.01); *H04N 1/4426* (2013.01); *H04N 2201/0094* (2013.01)

(58) Field of Classification Search
USPC ..... 358/1.15, 1.14, 1.13; 709/225; 726/4, 27
See application file for complete search history.

(56) References Cited

U.S. PATENT DOCUMENTS

| | | | |
|---|---|---|---|
| 2009/0021778 A1* | 1/2009 | Wei | H04N 1/32 358/1.15 |
| 2011/0222103 A1* | 9/2011 | Doui | G06F 21/608 358/1.14 |
| 2011/0235096 A1* | 9/2011 | Iwasawa | G06F 3/1222 358/1.15 |
| 2012/0206763 A1 | 8/2012 | Yoshida | |

FOREIGN PATENT DOCUMENTS

| | | | |
|---|---|---|---|
| JP | 2009078503 A | * | 4/2009 |
| JP | 2011-056918 A | | 3/2011 |
| JP | 2012-185804 A | | 9/2012 |

* cited by examiner

IMAGE FORMING APPARATUS, AND METHOD IN WHICH OUTPUT DESTINATION OF PRINT JOB IS CHANGED ACCORDING TO WHETHER USER AUTHENTICATION IS DONE, AND PRINTING SYSTEM INCLUDING TERMINAL DEVICE AND IMAGE FORMING APPARATUS

INCORPORATION BY REFERENCE

The present application claims priority under 35 U.S.C. §119 to Japanese Patent Application No. 2014-207061, filed on Oct. 8, 2014. The contents of this application are incorporated herein by reference in their entirety.

BACKGROUND

The present disclosure relates to an image forming apparatus, an image forming method, and a printing system.

In a known image processing system, an image forming apparatus performs printing of print data (print job) received from a client terminal device via a network. An image processing system such as described above may include an image forming apparatus that performs user authentication based on fingerprint information. In a more specific example, an image forming apparatus stores print data received from a client terminal device in a document storage section and starts printing after positively authenticating a user based on fingerprint information. Consequently, the image forming apparatus can perform user authentication through a simple configuration.

SUMMARY

An image forming apparatus according to the present disclosure is communicable with a terminal device. The image forming apparatus includes an interface section, a data storage section, an input section, an authentication section, and an image forming section. The interface section receives a print job from the terminal device. The print job is assigned terminal identification information identifying the terminal device. The data storage section stores the print job when the print job is output thereto from the interface section. The input section receives input of input information. The authentication section performs user authentication based on the input information. The image forming section forms an image on a sheet based on the print job. In accordance with whether or not the authentication section positively authenticates a user before a specified time elapses from the interface section receiving the print job from the terminal device, the interface section outputs the print job stored by the data storage section to the image forming section or the terminal device, and the data storage section deletes the print job stored.

An image forming method according to the present disclosure is implemented by an image forming apparatus that is communicable with a terminal device. The image forming apparatus includes an interface section, a data storage section, an input section, an authentication section, and an image forming section. The image forming section forms an image on a sheet. The image forming method includes receiving of a print job, outputting of the print job, storing of the print job, and receiving of input information. In the receiving of a print job, the interface section receives a print job that is transmitted from the terminal device and that is assigned terminal identification information identifying the terminal device. In the outputting of the print job, the interface section outputs the print job received from the terminal device to the data storage section. In the storing of the print job, the data storage section stores the print job output from the interface section. In the receiving of input information, the input section receives input information that is input by a user. In accordance with whether or not the authentication section positively authenticates the user based on the input information before a specified time elapses from the interface section receiving the print job from the terminal device, the image forming method further includes outputting of the print job and deleting of the print job. In the outputting of the print job, the interface section outputs the print job stored by the data storage section to the image forming section or the terminal device. In the deleting of the print job, the data storage section deletes the print job stored.

A printing system according to the present disclosure includes a terminal device and an image forming apparatus. The image forming apparatus is communicable with the terminal device. The image forming apparatus includes an interface section, a data storage section, an input section, an authentication section, and an image forming section. The image forming section forms an image on a sheet based on a print job. The print job is assigned terminal identification information that identifies the terminal device. The terminal device transmits the print job to the interface section. The interface section outputs, to the data storage section, the print job transmitted from the terminal device. The data storage section stores the print job output from the interface section. The input section receives input information input by a user. In accordance with whether or not the authentication section positively authenticates the user before a specified time elapses from the interface section receiving the print job from the terminal device, the interface section outputs the print job stored by the data storage section to the image forming section or the terminal device, and the data storage section deletes the print job stored.

DETAILED DESCRIPTION

Figure 1:
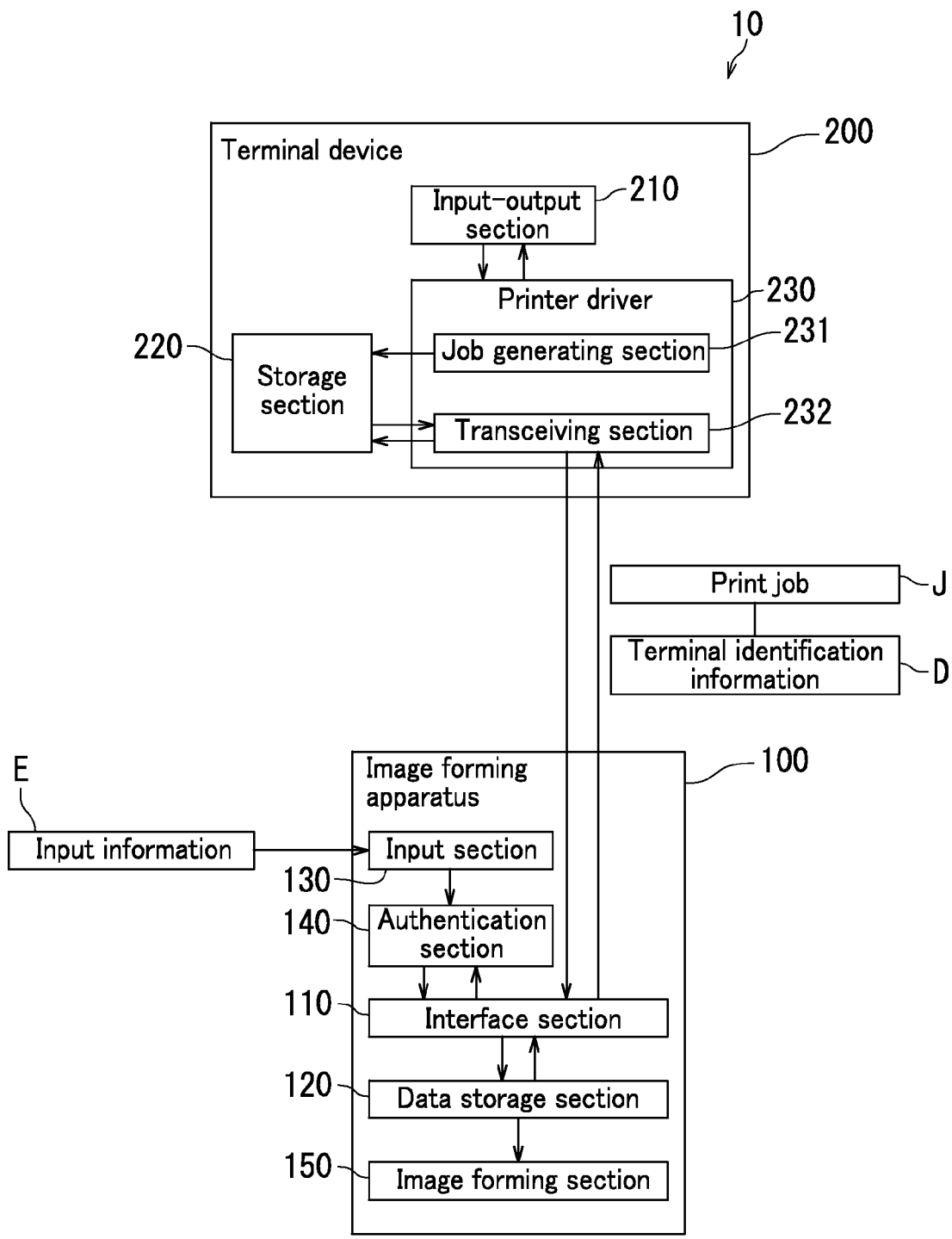
FIG. 1 is a block diagram illustrating configuration of a printing system according to an embodiment of the present disclosure.

The following explains embodiments of the present disclosure with reference to the drawings. Elements in the drawings that are the same or equivalent are marked by the same reference signs. Furthermore, explanation of such elements is not repeated.

The following explains overall configuration of a printing system 10 according to an embodiment of the present disclosure with reference to FIG. 1. FIG. 1 is a block diagram illustrating configuration of the printing system 10. The printing system 10 includes an image forming apparatus 100 and a terminal device 200.

The image forming apparatus 100 and the terminal device 200 form a network in which the image forming apparatus 100 and the terminal device 200 are communicably connected. The image forming apparatus 100 and the terminal device 200 are for example communicably connected via the Internet, a local area network (LAN), or a wide area network (WAN). The present embodiment is explained for a situation in which only a single specific user has the right to use the terminal device 200.

The terminal device 200 includes an input-output section 210 that is user operable, a storage section 220, and a printer driver 230 that is compatible with the image forming apparatus 100. The terminal device 200 is for example a personal computer. The terminal device 200 includes a central processing unit (CPU), read only memory (ROM), random access memory (RAM), and a hard disk drive (HDD). The terminal device 200 operates through the CPU executing various programs including an operating system (OS) and the printer driver 230. The various programs are stored in the ROM or the HDD. The HDD for example stores the printer driver 230 and application software for implementing document creation, spreadsheets, and the like. The RAM is used as a work area during execution of the various programs by the CPU.

The input-output section 210 includes a display device and an input device, and functions as a user interface. The display device notifies various types of information to the user. The display device is for example a liquid-crystal display. The input device receives user operations. The input device is for example a keyboard or a mouse. The display device and the input device can also be integrated as a touch panel.

The storage section 220 is able to store various types of data. The storage section 220 can be a region of non-volatile memory; the non-volatile memory is inclusive of the HDD.

The printer driver 230 includes a job generating section 231 and a transceiving section 232. The printer driver 230 is a program that is compatible with a model of the image forming apparatus 100.

The printer driver 230 is pre-installed in the HDD. Alternatively, the printer driver 230 can be retroactively installed in the HDD. For example, the printer driver 230 can be installed via a storage medium storing the printer driver 230 such as a compact disk-read only memory (CD-ROM) or flash memory, or can be distributed to the terminal device 200 via a network.

The job generating section 231 generates a print job J based on document information. The job generating section 231 functions through the CPU executing a control program stored in the ROM or the HDD. The document information is created in application software of the terminal device 200. Alternatively, the terminal device 200 can receive the document information from an external source. The document information is for example a Word file, an Excel file, or a Portable Document Format (PDF) file.

During generation of the print job J, the job generating section 231 assigns terminal identification information D to the print job J. The terminal identification information D is information that identifies the terminal device 200. For example, the terminal identification information D is information that can be used to determine the terminal device 200 such an identification number assigned to the terminal device 200, a serial number, or address information unique to the terminal device 200.

The print job J is a print command and is a file in which the document information is uneditable. The printing command includes printing settings such as monochrome or color, 2 in 1 setting, and number of printed copies.

The transceiving section 232 performs transmission and reception of the print job J with an interface section 110 of the image forming apparatus 100. The interface section 110 is explained further below. The user designates the image forming apparatus 100 as an output destination of the print job J via the input-output section 210 and performs the print command. The transceiving section 232 transmits the print job J to the interface section 110 in response to the user's operation. The terminal identification information D assigned to the print job J is transmitted to the interface section 110 in accompaniment to the print job J.

The storage section 220 stores the print job J generated by the job generating section 231. The storage section 220 also stores the print job J in a situation in which the print job J is received from the interface section 110 via the transceiving section 232.

The image forming apparatus 100 includes the interface section 110, a data storage section 120, an input section 130, an authentication section 140, and an image forming section 150 that forms an image on a sheet. The image forming apparatus 100 is for example a laser printer or an inkjet printer.

The image forming apparatus 100 includes a CPU, ROM, and RAM. The image forming apparatus 100 optionally includes an HDD. The ROM for example includes programmable ROM (PROM) such as flash memory. The RAM for example includes dynamic RAM (DRAM). The ROM for example stores programs such as a basic input/output system (BIOS), an OS, various drivers, and various applications. The image forming apparatus 100 implements functions of the interface section 110, the data storage section 120, the input section 130, the authentication section 140, and the image forming section 150 through execution, by the CPU, of the various programs stored by the ROM. The RAM is used as a work area during execution of the various programs by the CPU.

The interface section 110 outputs the print job J received from the transceiving section 232 to the data storage section 120. Depending on necessity thereof, the interface section 110 transmits the print job J stored by the data storage section 120 to the transceiving section 232.

The data storage section 120 stores the print job J output from the interface section 110. The data storage section 120 can be a region of non-volatile memory; the non-volatile memory is inclusive of the HDD.

The input section 130 receives input of input information E through a user operation. The input section 130 can for example be a group of keys such as a numeric keypad, a touch panel, or a card reader capable of reading a card. In an example in which only a single specific user has the right to use the terminal device 200, the input information E is the same as the terminal identification information D. The input section 130 receives the input information E that is input and outputs the input information E to the authentication section 140.

The authentication section 140 performs user authentication based on the input information E. More specifically, the authentication section 140 receives the input information E output from the input section 130. The authentication section 140 searches print jobs stored by the data storage section 120 to determine whether or not the print job J assigned the terminal identification information D that matches the input information E is present. The authentication section 140 compares the input information E to the terminal identification information D assigned to the print job J and upon confirming a match, positively authenticates the user. The authentication section 140 outputs a signal indicating that the user has been positively authenticated to the interface section 110. The interface section 110 outputs the print job J stored by the data storage section 120 to the image forming section 150 in response to the signal output from the authentication section 140.

The image forming section 150 forms an image on a sheet based on the print job J output from the interface section 110. More specifically, the image forming section 150 forms an image on a sheet in accordance with printing settings of the print job J, based on a control signal output from the interface section 110. Consequently, the image forming apparatus 100 outputs printed matter corresponding to the print job J. The data storage section 120 deletes the print job J stored thereby once the printed matter has been output by the image forming apparatus 100.

Figure 2A:
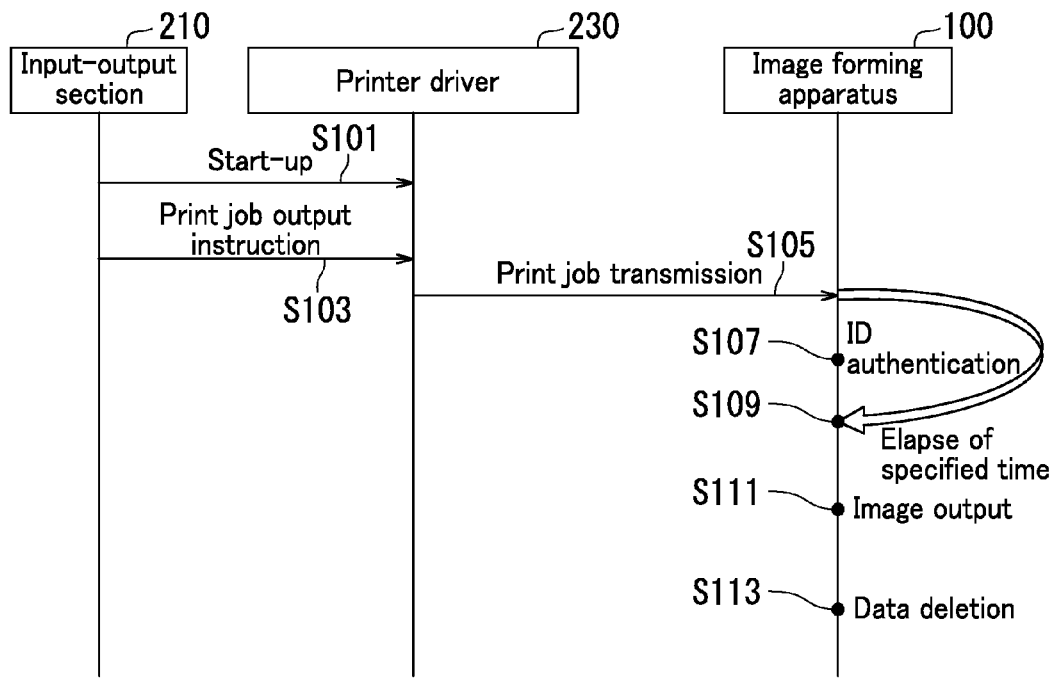
FIGS. 2A and 2B are sequence diagrams illustrating printing processing in a printing system according to an embodiment of the present disclosure.
Figure 2B:
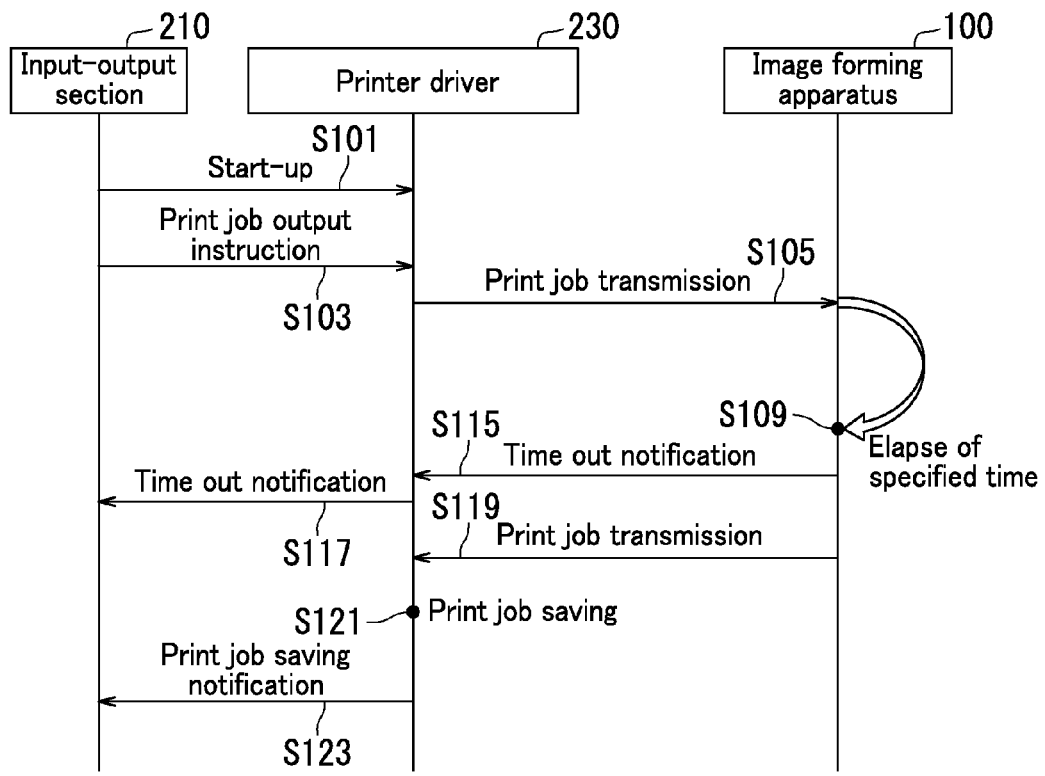

Printing processing in the printing system 10 according to the present embodiment is explained in detail with reference to FIGS. 1, 2A, and 2B. FIGS. 2A and 2B are sequence diagrams illustrating printing processing in the printing system 10. Steps S101 to S109 in FIG. 2B respectively correspond to Steps S101 to S109 in FIG. 2A and involve the same processing.

As illustrated in FIG. 2A, the user starts up the printer driver 230 via the input-output section 210 in Step S101. The user typically operates the input device of the input-output section 210 to create document information using application software. The user then presses a print button in the application software. Consequently, the printer driver 230 starts up. The printer driver 230 presents a user interface screen to the user via the display device of the input-output section 210. The display device displays a printing settings screen of the printer driver 230. Printing processing subsequently proceeds to Step S103.

In Step S103, the printer driver 230 receives an output instruction for a print job J. More specifically, the user designates the image forming apparatus 100 as an output destination of the print job J via the input-output section 210 and performs a print command. The job generating section 231 generates the print job J based on the document information. The job generating section 231 assigns terminal identification information D to the print job J. The storage section 220 stores the print job J. Printing processing subsequently proceeds to Step S105.

In Step S105, the printer driver 230 transmits the print job J to the image forming apparatus 100. More specifically, the transceiving section 232 transmits the print job J to which the terminal identification information D has been assigned to the interface section 110 and at the same time notifies an output request for the print job J to the interface section 110. The storage section 220 subsequently deletes the print job J stored thereby. In printing processing described below, the storage section 220 deletes the print job J stored thereby in the same way in instances in which the transceiving section 232 transmits the print job J to the interface section 110.

The interface section 110 receives the print job J from the transceiving section 232 and causes the data storage section 120 to store the print job J. The interface section 110 notifies the authentication section 140 that the print job J has been received. The authentication section 140 performs time measurement starting from when the notification is received from the interface section 110. A time that is to be measured by the authentication section 140 is specified in advance. The specified time is for example one hour. Printing processing proceeds to Step S107 once the authentication section 140 has started measuring the specified time.

In Step S107, the authentication section 140 performs ID authentication. More specifically, input information E is input to the input section 130 through an operation by the user. The input section 130 receives the input information E and outputs the input information E to the authentication section 140. The authentication section 140 receives the input information E. The authentication section 140 searches among print jobs stored by the data storage section 120 in order to confirm whether or not the print job J assigned the terminal identification information D that matches the input information E is present. The authentication section 140 compares the input information E to the terminal identification information D assigned to the print job J and upon confirming a match, positively authenticates the user. The authentication section 140 outputs a signal indicating that the user has been positively authenticated to the interface section 110. Printing processing subsequently proceeds to Step S109.

In Step S109, the authentication section 140 confirms that the specified time has elapsed. More specifically, the authentication section 140 performs time measurement starting from when notification is received from the interface section 110 as explained in Step S105 and confirms that the specified time has elapsed in Step S109.

Printing processing proceeds to Step S111 in a situation in which ID authentication (Step S107) is completed before Step S109; that is, in a situation in which the authentication section 140 positively authenticates the user based on the input information E before the specified time elapses from the interface section 110 receiving the print job J from the terminal device 200.

As illustrated in FIG. 2B, the authentication section 140 outputs a signal indicating that the specified time has elapsed (referred to as a "time out notification signal") to the interface section 110 in a situation in which ID authentication (Step S107) is not completed before Step S109; that is, in a situation in which the authentication section 140 does not positively authenticate the user based on the input information E before the specified time elapses. Printing processing subsequently proceeds to Step S115 shown in FIG. 2B. Examples of situations in which the user is not positively authenticated include a situation in which the user fails to input the input information E to the input section 130 within the specified time due to slowness or forgetfulness, a situation in which the input information E does not match the terminal identification information D, and a situation in which printing processing executed previously for another user other than the current user has not been completed and the authentication section 140 is on standby to perform authentication of the user.

As illustrated in FIG. 2A, the image forming apparatus 100 outputs an image in Step S111. More specifically, the authentication section 140 outputs a signal indicating that the user has been positively authenticated to the interface section 110. In response to the output signal, the interface section 110 outputs the print job J stored in the data storage section 120 to a destination external to the data storage section 120. In other words, the interface section 110 outputs the print job J to the image forming section 150. The image forming section 150 forms an image on a sheet based on the print job J. Consequently, the image forming apparatus 100 outputs printed matter corresponding to the print job J. Printing processing then proceeds to Step S113.

In Step S113, the image forming apparatus 100 deletes data. More specifically, the data storage section 120 deletes the print job J stored thereby. Printing processing ends as a result of the above.

As explained further above, printing processing proceeds to Step S115 shown in FIG. 2B in a situation in which ID authentication (Step S107) is not completed before Step S109. In Step S115, the image forming apparatus 100 notifies the printer driver 230 that a time out has occurred. More specifically, the interface section 110 transmits a time out notification signal to the transceiving section 232 based on the terminal identification information D assigned to the print job J. Through the above, the interface section 110 rejects the output request from the transceiving section 232 shown in Step S105. The transceiving section 232 receives the time out notification signal. Printing processing subsequently proceeds to Step S117.

In Step S117, the printer driver 230 outputs a time out notification signal to the input-output section 210. More specifically, the transceiving section 232 outputs the received time out notification signal to the input-output section 210. In response to the time out notification signal, the input-output section 210 notifies the user that the specified time has elapsed. Printing processing subsequently proceeds to Step S119.

In Step S119, the image forming apparatus 100 transmits the print job J to the printer driver 230. More specifically, the interface section 110 outputs the print job J stored by the data storage section 120 to a destination external to the data storage section 120. In other words, the interface section 110 outputs the print job J to the transceiving section 232. Afterwards, the data storage section 120 deletes the print job J stored thereby. Printing processing subsequently proceeds to Step S121. In printing processing described below, the data storage section 120 deletes the print job J stored thereby in the same way in instances in which the interface section 110 transmits the print job J to the transceiving section 232.

In Step S121, the printer driver 230 saves the print job J. More specifically, the transceiving section 232 receives the print job J transmitted from the interface section 110. The transceiving section 232 causes the storage section 220 to store the print job J. Printing processing subsequently proceeds to Step S123.

In Step S123, the printer driver 230 notifies the user, via the input-output section 210, that the print job J has been saved. Afterwards, the printer driver 230 keeps printing processing on standby until the image forming apparatus 100 performs ID authentication shown in Step S107 or the user makes a deletion instruction for the print job J.

As explained above with reference to FIGS. 1, 2A, and 2B, the transceiving section 232 transmits the print job J to the interface section 110. The data storage section 120 stores the print job J when the print job J is output thereto from the interface section 110. In a situation in which the authentication section 140 positively authenticates the user before the specified time elapses, the image forming section 150 forms an image on a sheet based on the print job J. The data storage section 120 subsequently deletes the print job J. In a situation in which the authentication section 140 does not positively authenticate the user before the specified time elapses, the interface section 110 transmits the print job J to the transceiving section 232. The storage section 220 stores the print job J. In addition, the data storage section 120 deletes the print job J stored thereby. Consequently, the print job J does not remain in the data storage section 120 for longer than a certain time. Therefore, a situation in which memory capacity of the image forming apparatus 100 is insufficient can be avoided. As a result, memory capacity for storing print jobs can be used efficiently.

Figure 3:
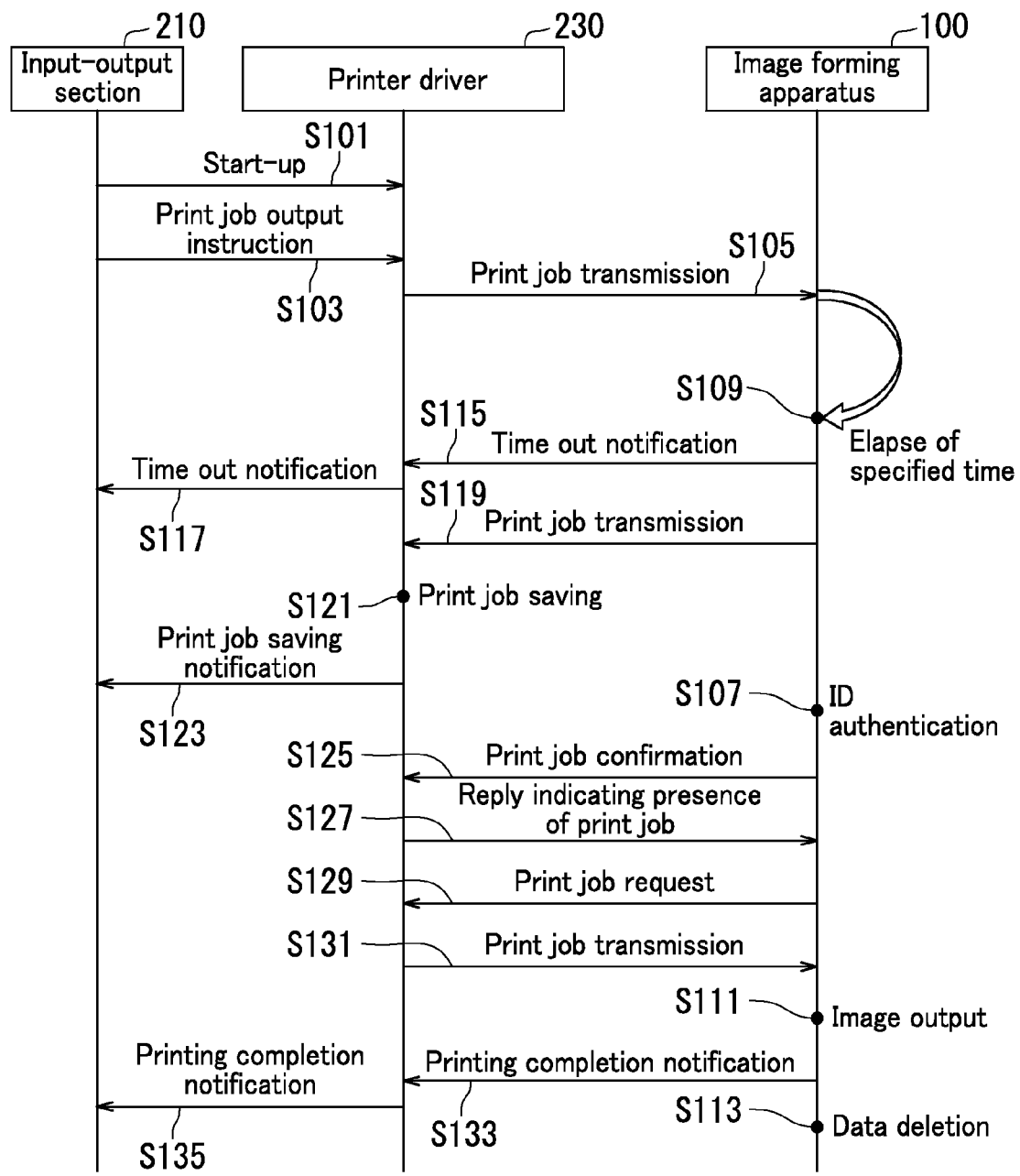
FIG. 3 is a sequence diagram illustrating printing processing in a printing system according to an embodiment of the present disclosure.
Figure 4:
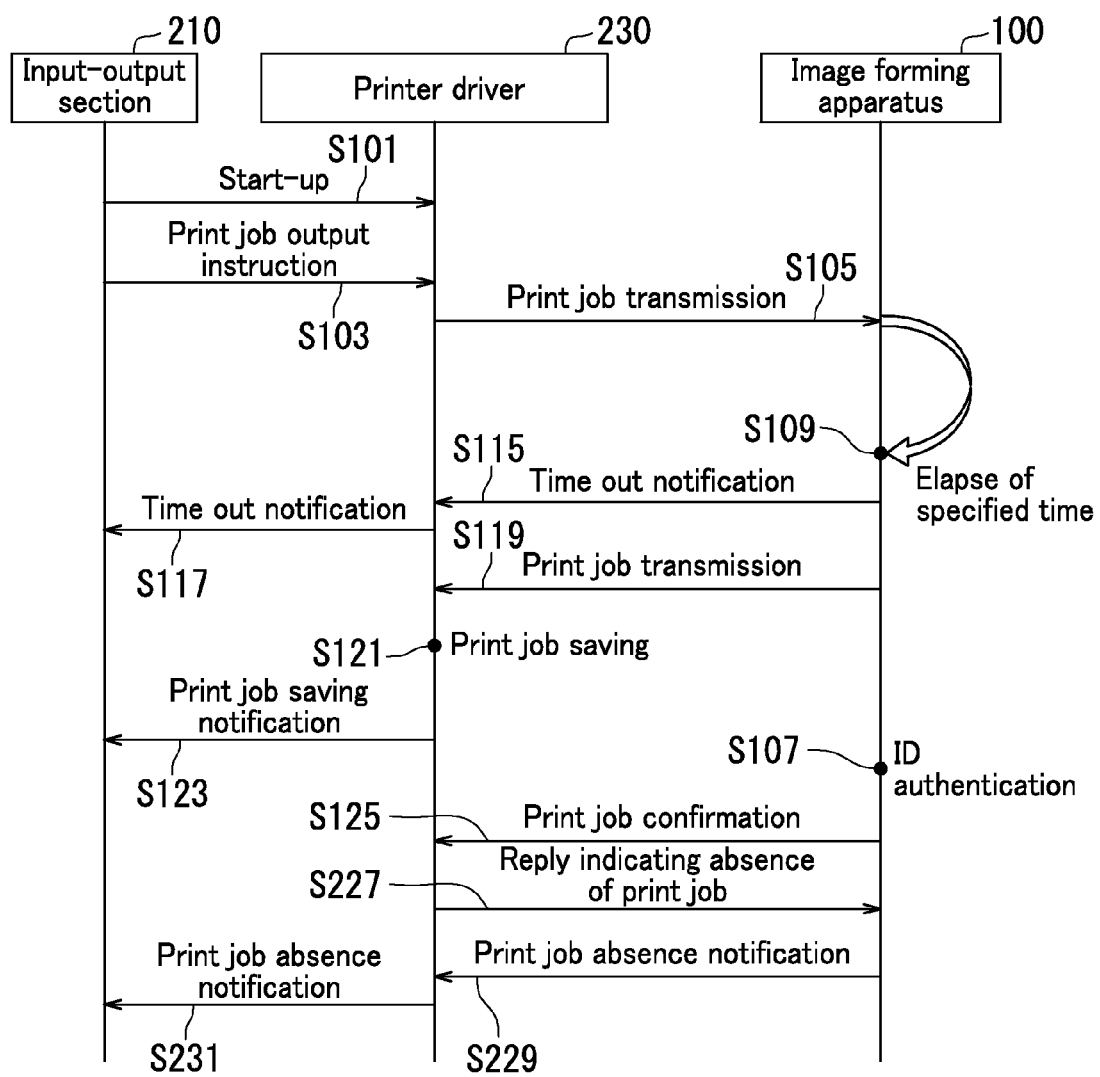
FIG. 4 is a sequence diagram illustrating printing processing in a printing system according to an embodiment of the present disclosure.

Although a situation in which the authentication section 140 does not positively authenticate the user before the specified time elapses was explained with reference to FIG. 2B, in such a situation the authentication section 140 can still positively authenticate the user after the specified time elapses as shown in FIGS. 1, 3, and 4. FIGS. 3 and 4 are sequence diagrams illustrating printing processing in the printing system 10.

Steps S101 to S123 shown in FIG. 3 respectively correspond to Steps S101 to S123 explained with reference to FIG. 2B and involve the same processing. Printing processing proceeds to Step S107 after Step S123.

Step S107 corresponds to Step S107 explained with reference to FIG. 2A and involves the same processing. Printing processing subsequently proceeds to Step S125.

In Step S125, the image forming apparatus 100 confirms whether or not the print job J is present in the printer driver 230. More specifically, the interface section 110 confirms with the transceiving section 232, whether or not the print job J assigned the terminal identification information D that matches the input information E is stored by the storage section 220. The interface section 110 transmits a job confirmation signal to the transceiving section 232 in order to confirm whether or not the print job J is present. The transceiving section 232 confirms whether or not the print job J is stored by the storage section 220 in response to the received job confirmation signal. Printing processing proceeds to Step S127 in a situation in which the print job J is stored by the storage section 220. Printing processing proceeds to Step S227 shown in FIG. 4 in a situation in which the print job J is not stored by the storage section 220. Examples of situations in which the print job J is not stored by the storage section 220 include a situation in which the print job J has been deleted from the storage section 220 after Step S123 through a user operation.

In Step S127, the printer driver 230 replies to the image forming apparatus 100 that the print job J is present. More specifically, the transceiving section 232 transmits a signal indicating that the print job J is stored by the storage section 220 to the interface section 110. Printing processing subsequently proceeds to Step S129.

In Step S129, the image forming apparatus 100 makes a request to the printer driver 230 for the print job J. More specifically, the interface section 110 transmits a job request signal to the transceiving section 232 in order to request the print job J stored by the storage section 220. Printing processing subsequently proceeds to Step S131.

In Step S131, the printer driver 230 transmits the print job J to the image forming apparatus 100. More specifically, the transceiving section 232 transmits the print job J to the interface section 110 in response to the job request signal. The interface section 110 outputs the print job J to the data storage section 120. The data storage section 120 stores the print job J. Printing processing subsequently proceeds to Step S111.

Step S111 corresponds to Step S111 explained with reference to FIG. 2A and involves the same processing. Printing processing subsequently proceeds to Step S133.

In Step S133, the image forming apparatus 100 notifies the printer driver 230 that printing has been completed. More specifically, the interface section 110 transmits a signal indicating that printing has been completed (referred to below as a "printing completion notification signal") to the transceiving section 232. Printing processing subsequently proceeds to Step S135.

In Step S135, the printer driver 230 outputs a printing completion notification signal to the input-output section 210. More specifically, the transceiving section 232 outputs the printing completion notification signal received from the interface section 110 to the input-output section 210. The input-output section 210 notifies the user that printing has been completed in response to the printing completion notification signal. Printing processing subsequently proceeds to Step S113.

Step S113 corresponds to Step S113 explained with reference to FIG. 2A and involves the same processing. Printing processing ends after processing in Step S113.

In a situation in which the print job J is not stored by the storage section 220 in Step S125 described further above, printing processing proceeds to Step S227 shown in FIG. 4. Steps S101 to S125 shown in FIG. 4 respectively correspond to Steps S101 to S125 explained with reference to FIGS. 2A, 2B, and 3 and involve the same processing.

In Step S227, the printer driver 230 replies to the image forming apparatus 100 that the print job J is not present. More specifically, the transceiving section 232 transmits a signal indicating that the print job J is not stored by the storage section 220 to the interface section 110. The interface section 110 ends confirmation of whether or not the print job J is present in response to the signal transmitted from the transceiving section 232. Printing processing subsequently proceeds to Step S229.

In Step S229, the image forming apparatus 100 notifies the printer driver 230 that the print job J is not present. More specifically, the interface section 110 outputs a signal indicating that the print job J was not found and that printing has not been completed to the transceiving section 232. Printing processing subsequently proceeds to Step S231.

In Step S231, the printer driver 230 notifies the input-output section 210 that the print job J is not present. More specifically, the transceiving section 232 outputs the signal received from the interface section 110 to the input-output section 210. The input-output section 210 notifies the user that the print job J was not found and that printing has not been completed. Consequently, printing processing ends.

As a result of performing printing processing explained with reference to FIGS. 1, 3, and 4, in a situation in which, for example, a time out occurs when the user is not positively authenticated within the specified time due to the image forming apparatus 100 being in use by another user, the user can output printed matter from the image forming apparatus 100 without returning to the terminal device 200.

Furthermore, as a result of the interface section 110 transmitting the job confirmation signal to the printer driver 230, the user can confirm whether or not the print job J is stored by the printer driver 230. Therefore, extended retention of the print job J by the storage section 220 of the printer driver 230 can be avoided.

Figure 5:
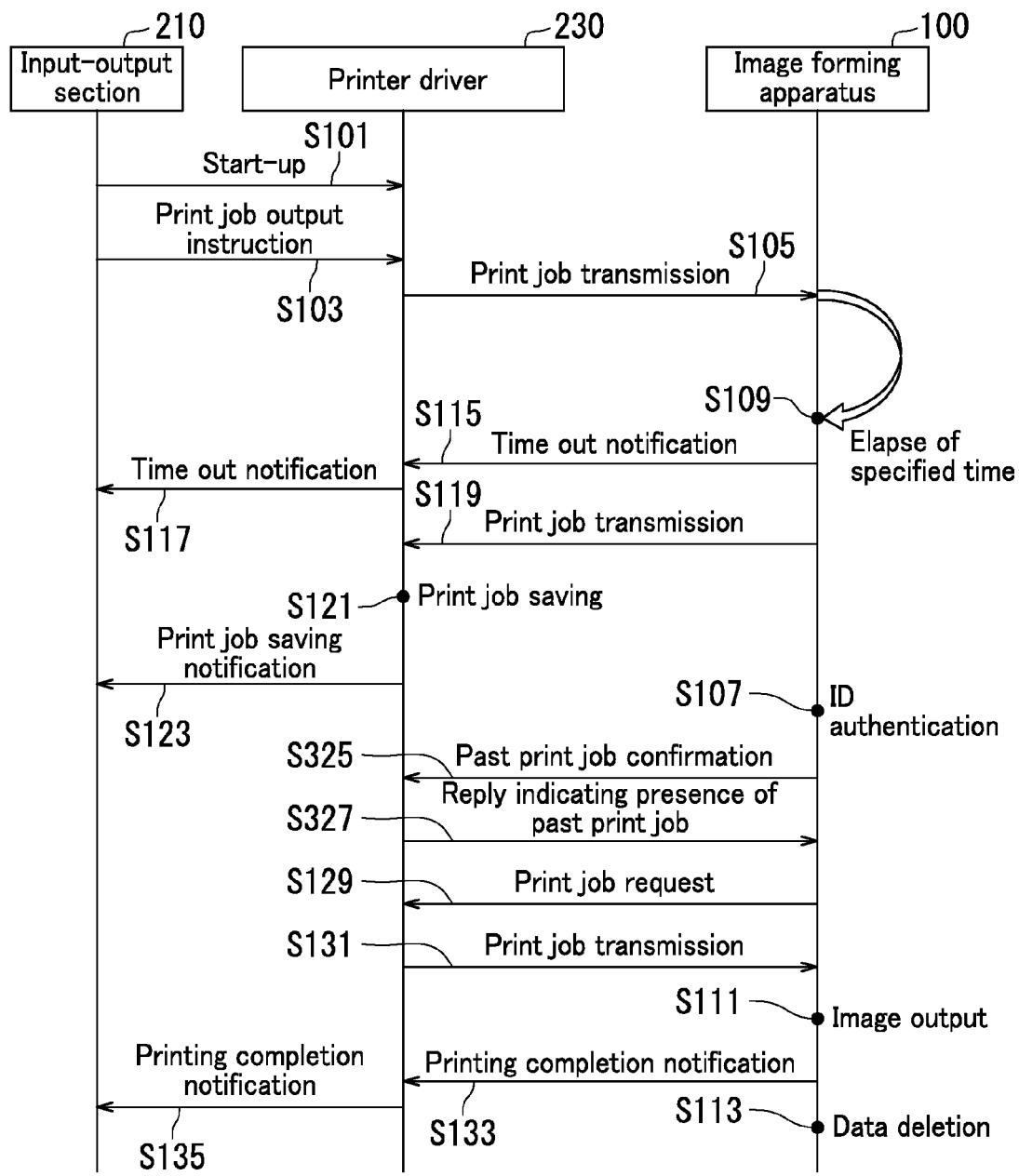
FIG. 5 is a sequence diagram illustrating printing processing in a printing system according to an embodiment of the present disclosure.
Figure 6:
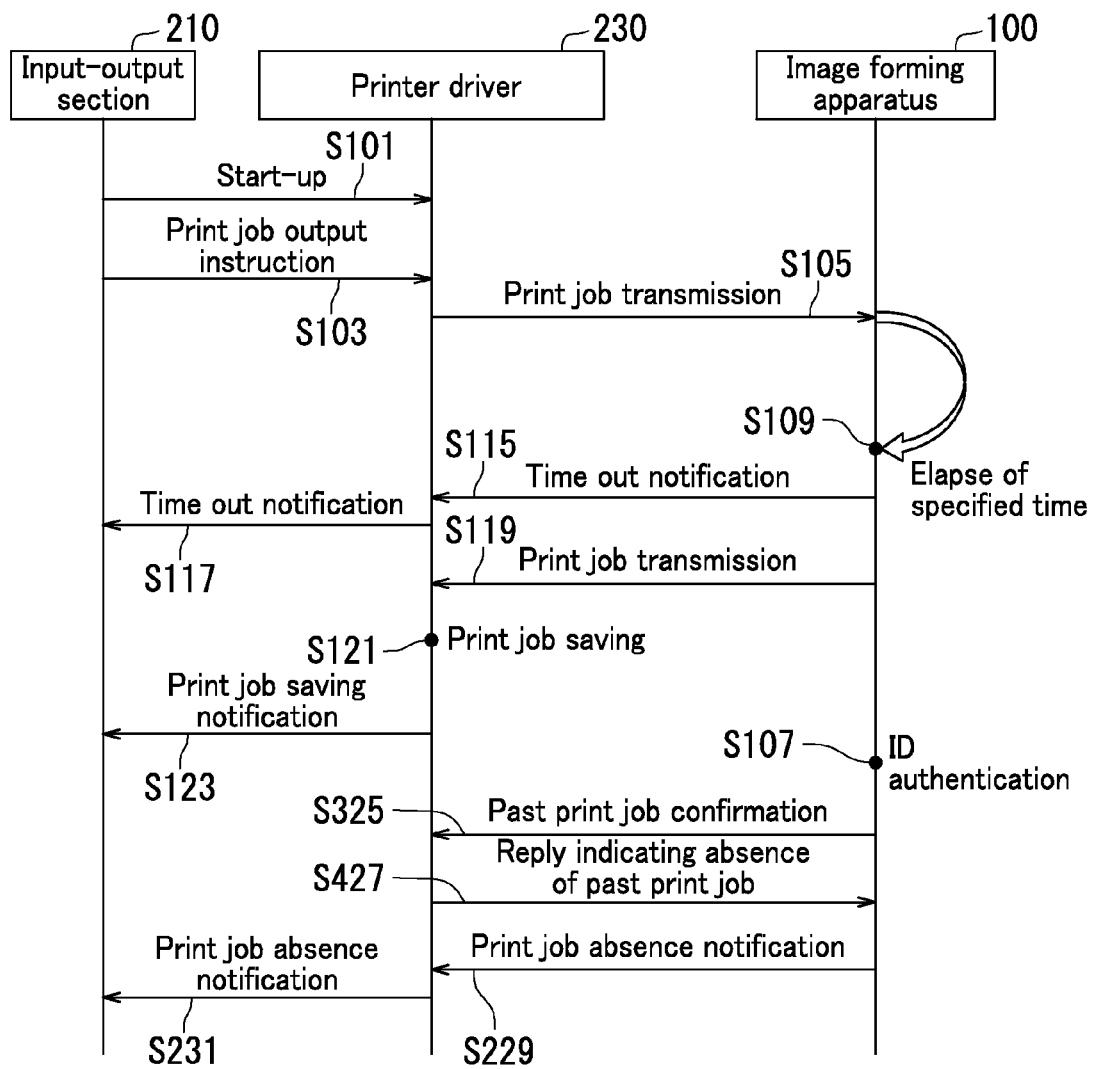
FIG. 6 is a sequence diagram illustrating printing processing in a printing system according to an embodiment of the present disclosure.

As illustrated in FIGS. 1, 5, and 6, after the authentication section 140 positively authenticates the user, the interface section 110 can transmit a job request signal to the terminal device 200 in order to request a past print job PJ. FIGS. 5 and 6 are sequence diagrams illustrating printing processing in the printing system 10. The past print job PJ is a print job that was a target for a time out notification further in the past than the print job J that was a target for the time out notification in Step S115 (FIGS. 2B, 3, and 4).

Steps S101 to S123 and Step S107 shown in FIG. 5 respectively correspond to Steps S101 to S123 and Step S107 explained with reference to FIG. 3 and involve the same processing. Printing processing proceeds to Step S325 after Step S123.

In Step S325, the image forming apparatus 100 confirms whether or not the past print job PJ is present in the printer driver 230. More specifically, the interface section 110 transmits a job confirmation signal to the transceiving section 232 in order to confirm whether or not the print job J and the past print job PJ are present in the same way as in Step S125 shown in FIG. 3. Printing processing proceeds to Step S327 in a situation in which the past print job PJ is stored by the storage section 220. Printing processing proceeds to Step S427 shown in FIG. 6 in a situation in which the past print job PJ is not stored by the storage section 220.

In Step S327, the printer driver 230 notifies the image forming apparatus 100 that the past print job PJ is stored. More specifically, the transceiving section 232 transmits a signal indicating that the past print job PJ is stored by the storage section 220 to the interface section 110 in the same way as in Step S127 shown in FIG. 3. Printing processing subsequently proceeds to Step S129.

Steps S129 to S135 and Step S113 respectively correspond to Steps S129 to S135 and Step S113 explained with reference to FIG. 3 and involve the same processing. Printing processing ends after Step S113.

In a situation in which the past print job PJ is not stored by the storage section 220 in Step S325 described further above, printing processing proceeds to Step S427 shown in FIG. 6. Steps S101 to S325 shown in FIG. 6 respectively correspond to Steps S101 to S325 explained with reference to FIGS. 2A, 2B, and 3-5 and involve the same processing.

In Step S427, the printer driver 230 notifies the image forming apparatus 100 that the past print job PJ is not stored in the same way as in Step S227 shown in FIG. 4. Printing processing subsequently proceeds to Step S229.

Step S229 and Step S231 respectively correspond to Step S229 and Step S231 explained with reference to FIG. 4 and involve the same processing. Printing processing ends after Step S231.

As a result of printing processing explained with reference to FIGS. 1, 5, and 6 being performed, the image forming apparatus 100 can print the past print job PJ. Therefore, even in a situation in which, for example, the user rewrites the document information that is a source of the past print job PJ in the terminal device 200, the user can still perform printing based on the past print job PJ for the document information prior to rewriting.

Furthermore, as a result of the interface section 110 transmitting the job confirmation signal to the printer driver 230, the user can confirm whether or not the past print job PJ is stored by the printer driver 230. Therefore, extended retention of the past print job PJ by the storage section 220 of the printer driver 230 can be avoided.

Figure 7:
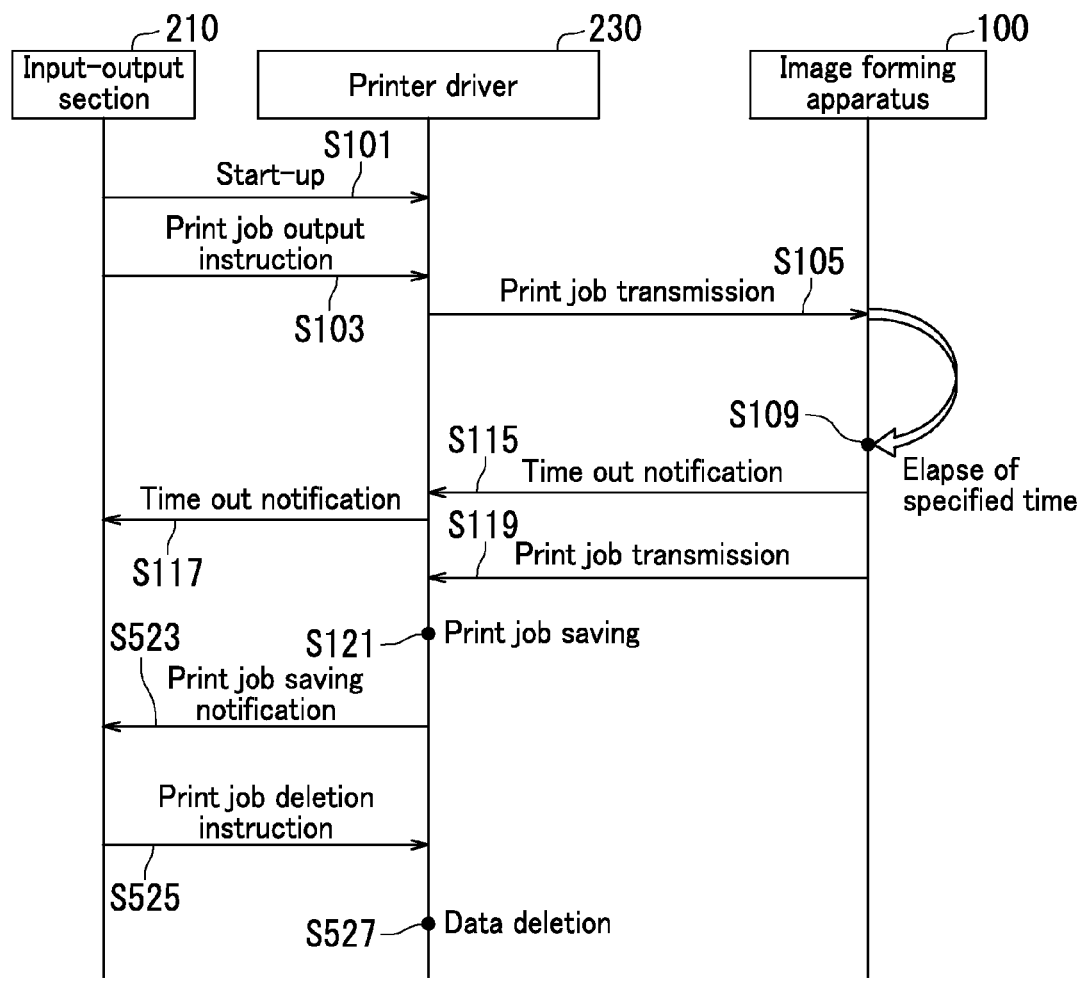
FIG. 7 is a sequence diagram illustrating printing processing in a printing system according to an embodiment of the present disclosure.

As illustrated in FIGS. 1 and 7, the printer driver 230 can enquire to the user, via the input-output section 210, whether or not to delete the print job J transmitted from the interface section 110, after the print job J has been stored by the storage section 220. FIG. 7 is a sequence diagram illustrating printing processing in the printing system 10.

Steps S101 to S121 shown in FIG. 7 respectively correspond to Steps S101 to S121 explained with reference to FIG. 2B and involve the same processing. Printing processing proceeds to Step S523 after Step S121.

In Step S523, the printer driver 230 notifies the user, via the input-output section 210, that the print job J has been saved. More specifically, the printer driver 230 notifies the user that the print job J has been stored by the storage section 220 and at the same time enquires to the user whether or not to delete the print job J. Printing processing subsequently proceeds to Step S525.

In Step S525, the input-output section 210 instructs the printer driver 230 to delete the print job J. More specifically, in response to a user operation, the input-output section 210 outputs a signal instructing deletion of the print job J to the storage section 220. Printing processing subsequently proceeds to Step S527.

In Step S527, the printer driver 230 deletes data. More specifically, the storage section 220 deletes the print job J in response to the signal output from the input-output section 210. Consequently, printing processing ends.

As a result of printing processing explained with reference to FIGS. 1 and 7 being performed, the storage section 220 deletes the print job J stored thereby. Therefore, a situation in which there is insufficient memory capacity for storing print jobs in the printer driver 230 can be avoided.

Figure 8A:
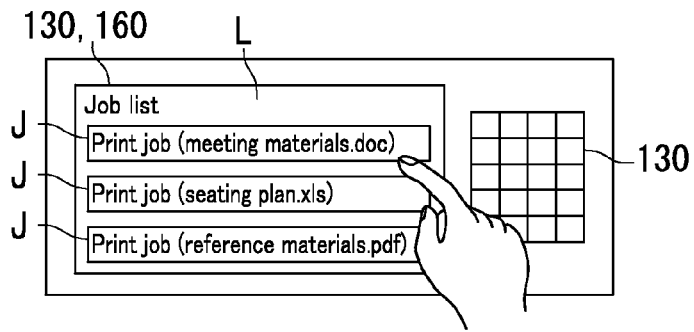
FIG. 8A is a schematic diagram illustrating an operation display section of an image forming apparatus in a printing system according to an embodiment of the present disclosure.
Figure 8B:
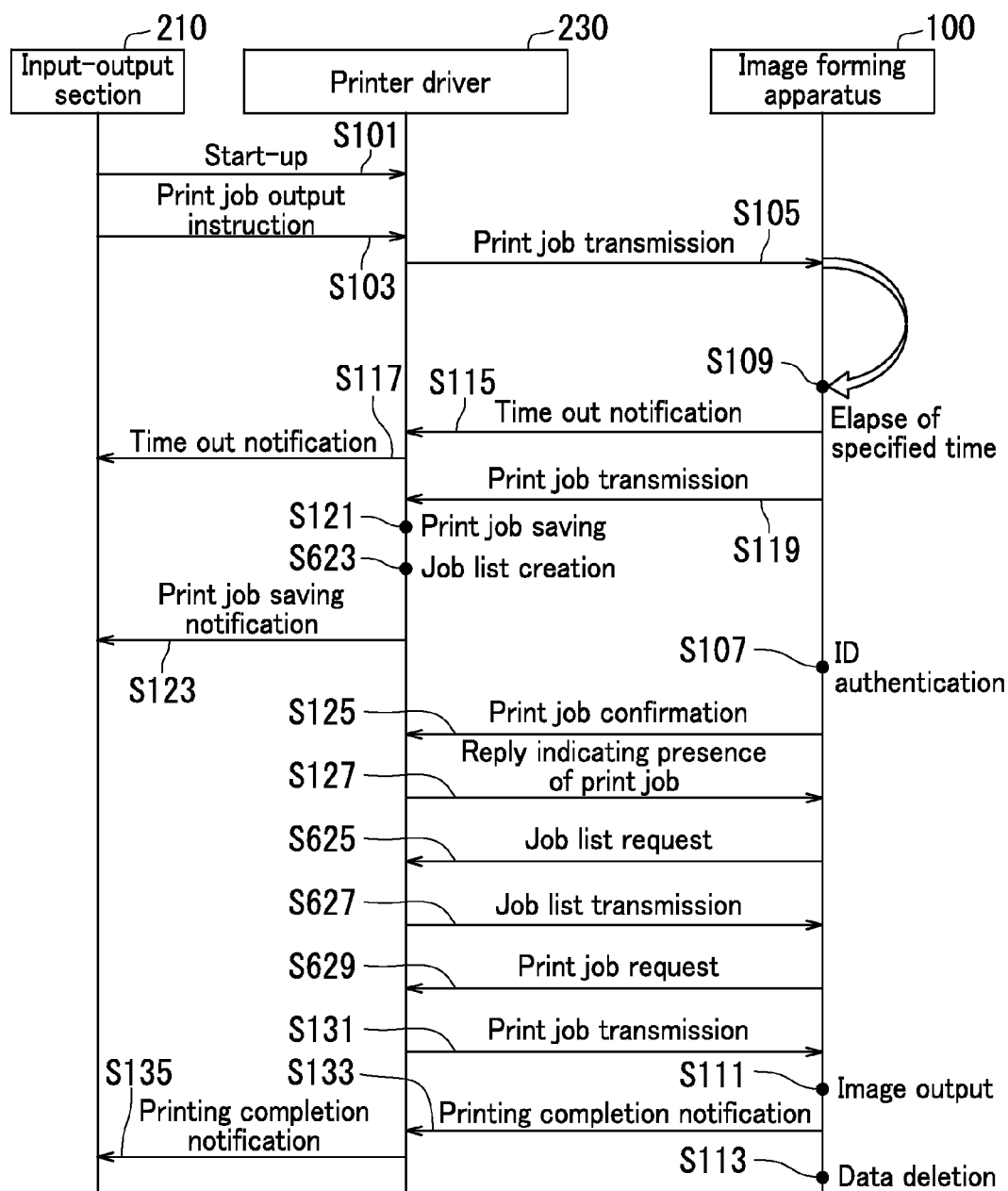
FIG. 8B is a sequence diagram illustrating printing processing in a printing system according to an embodiment of the present disclosure.

As illustrated in FIG. 8A, the image forming apparatus 100 preferably further includes a display section 160. FIG. 8A is a schematic diagram illustrating the input section 130 and the display section 160 of the image forming apparatus 100. FIG. 8B is a sequence diagram illustrating printing processing in the printing system 10.

As illustrated in FIG. 8A, the display section 160 displays a job list L. The display section 160 is formed by a display such as a liquid-crystal display (LCD) or an electroluminescence display (ELD) having a touch panel function. User operations are input to the input section 130. The display section 160 and part of the input section 130 may be integrated in an embodiment in which a touch panel functions as the display section 160 and the input section 130. A group of keys such as a numeric keypad functions as part of the input section 130.

The job list L is a list that identifies print jobs J stored by the storage section 220. The list L for example indicates the print jobs J as file names such as "meeting materials.doc," "seating plan.xls," and "reference materials.pdf." When a print job J is stored by the storage section 220, the job generating section 231 creates a job list L based on the print job J. The job list L is stored by the storage section 220. The job generating section 231 can create the job list L at the same time as the storage section 220 stores the print job J. The job generating section 231 can update the job list L by searching for print jobs J stored by the storage section 220 at fixed time intervals.

Through display of the job list L, the display section 160 indicates file names of print jobs J to the user in list format. The user for example inputs an instruction designating a print job J to the input section 130.

The following explains printing processing using the job list L with reference to FIGS. 1 and 8B. Steps S101 to S121 respectively correspond to Steps S101 to S121 explained with reference to FIG. 2B and involve the same processing. Printing processing proceeds to Step S623 after Step S121.

In Step S623, the printer driver 230 creates a job list L. More specifically, the job generating section 231 creates the job list L based on terminal identification information D assigned to print jobs J. The job list L indicates print jobs J having the same terminal identification information D as file names. The storage section 220 stores the job list L. Printing processing subsequently proceeds to Step S123.

Step S123 corresponds to Step S123 explained with reference to FIG. 2B and involves the same processing. Printing processing proceeds to Step S107 after Step S123.

Step S107 corresponds to Step S107 explained with reference to FIG. 2A and involves the same processing. Printing processing subsequently proceeds to Step S125.

Step S125 and Step S127 respectively correspond to Step S125 and Step S127 explained with reference to FIG. 3 and involve the same processing. Printing processing proceeds to Step S625 after Step S127.

In Step S625, the image forming apparatus 100 makes a request to the printer driver 230 for the job list L. More specifically, the interface section 110 transmits a list request signal to the transceiving section 232 in order to request the job list L stored by the storage section 220. Printing processing subsequently proceeds to Step S627.

In Step S627, the printer driver 230 transmits the job list L to the image forming apparatus 100. More specifically, the transceiving section 232 transmits the job list L to the interface section 110 in response to the list request signal transmitted from the interface section 110. The interface section 110 receives the job list L from the transceiving section 232. Printing processing subsequently proceeds to Step S629.

In Step S629, the image forming apparatus 100 makes a request to the printer driver 230 for a print job J. More specifically, the interface section 110 outputs the job list L received from the transceiving section 232 to the display section 160. The display section 160 displays the job list L output from the interface section 110. The user checks file names of print jobs J indicated by the job list L on the display section 160. The user inputs an instruction designating a print job J to the input section 130. The interface section 110 transmits a job request signal to the transceiving section 232 in order to request the designated print job J. Printing processing subsequently proceeds to Step S131.

Steps S131 to S113 respectively correspond to Steps S131 to S113 explained with reference to FIG. 3 and involve the same processing. Printing processing ends after Step S113.

As a result of printing processing explained above with reference to FIGS. 1, 8A, and 8B being performed, a user can output printed matter after confirming whether or not a print job J is a desired print job. Therefore, erroneous printing by the user can be avoided.

Figure 9:
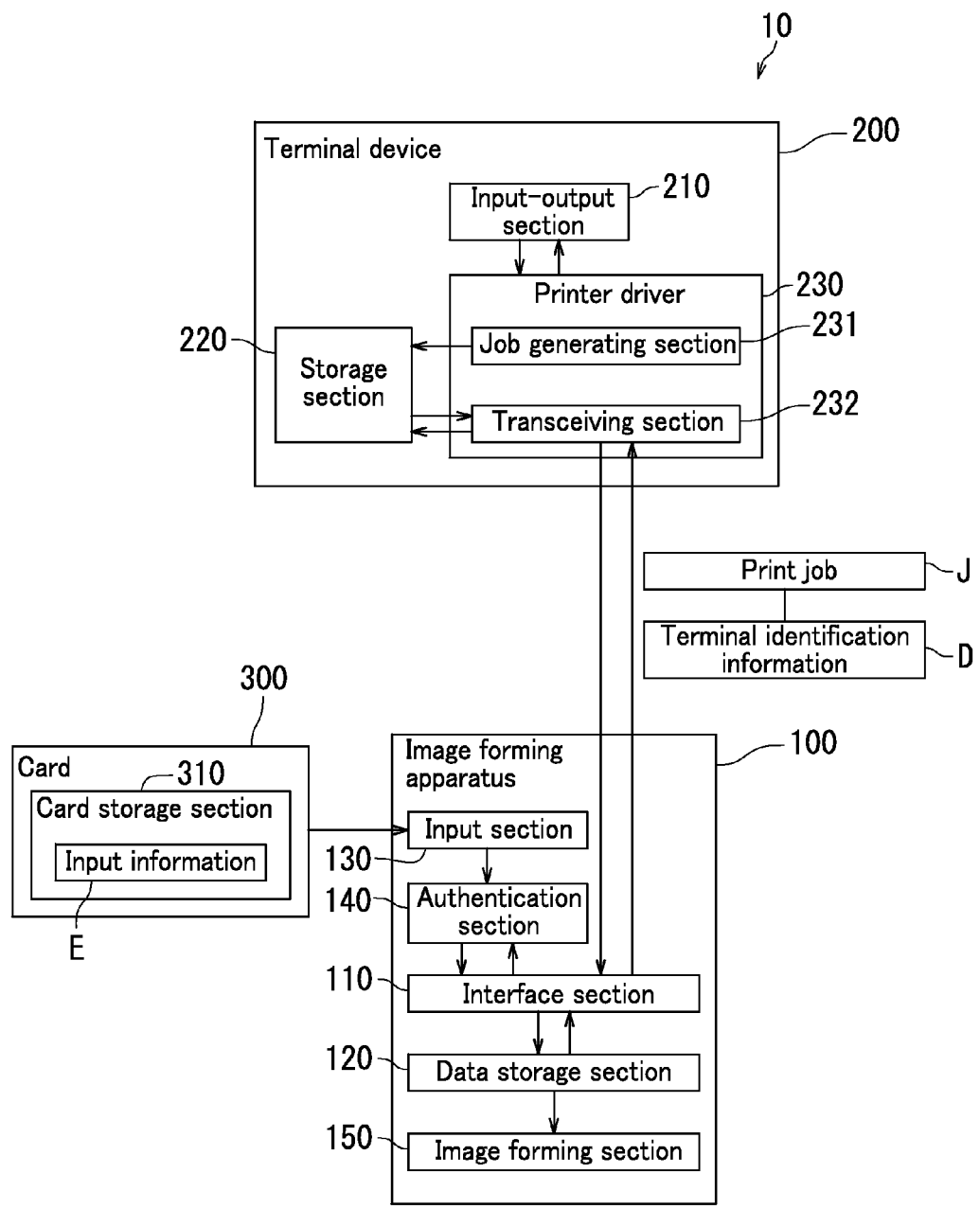
FIG. 9 is a block diagram illustrating configuration of a printing system according to an embodiment of the present disclosure.

As illustrated in FIG. 9, the input section 130 is preferably a card reader capable of reading input information E from a card 300. FIG. 9 is a block diagram illustrating configuration of a printing system 10. In comparison with the printing system 10 illustrated in FIG. 1, which includes the image forming apparatus 100 and the terminal device 200, the printing system 10 illustrated in FIG. 9 also includes an image forming apparatus 100 and a terminal device 200, but differs in terms that a card reader functions as an input section 130. The following omits explanation of aspects that are the same as for the printing system 10 illustrated in FIG. 1 in order that differences to the printing system 10 illustrated in FIG. 1 are clear.

The card reader functions as the input section 130. In an embodiment in which the card reader functions as part of the input section 130, the card reader may be provided in conjunction with a touch panel and a group of keys.

The card 300 includes a card storage section 310. The card storage section 310 stores the input information E shown in FIG. 1. The card 300 is for example an IC card or a magnetic card. Examples of IC cards that can be used include contact IC cards and contactless IC cards. The card 300 can for example be used as an employee ID card or a student ID card.

In an embodiment in which the card 300 is an IC card, the card storage section 310 is semiconductor memory. Examples of semiconductor memory include RAM, ROM, and electrically erasable programmable read-only memory (EEPROM). In an embodiment in which the card 300 is a magnetic card, the card storage section 310 is a magnetic recording layer.

The card reader is an IC card reader or a magnetic card reader. The card reader is connected to the authentication section 140 via a universal serial bus (USB) and a substrate. The card reader is compatible with functionality of the card 300 and reads information stored by the card storage section 310. For example, in an embodiment in which the card 300 is a contact IC card, the card reader is a contact IC card reader. The card reader communicates wirelessly with the card 300 using electromagnetic waves and reads information such as the input information E from the card storage section 310.

The card reader receives the read input information E and outputs the input information E to the authentication section 140. The authentication section 140 performs user authentication based on the input information E output from the card reader.

As explained above with reference to FIG. 9, the card reader reads the input information E from the card 300. Consequently, the user is not required to manually input the input information E to the input section 130. Therefore, the length of time required for user authentication can be shortened.

Figure 10:
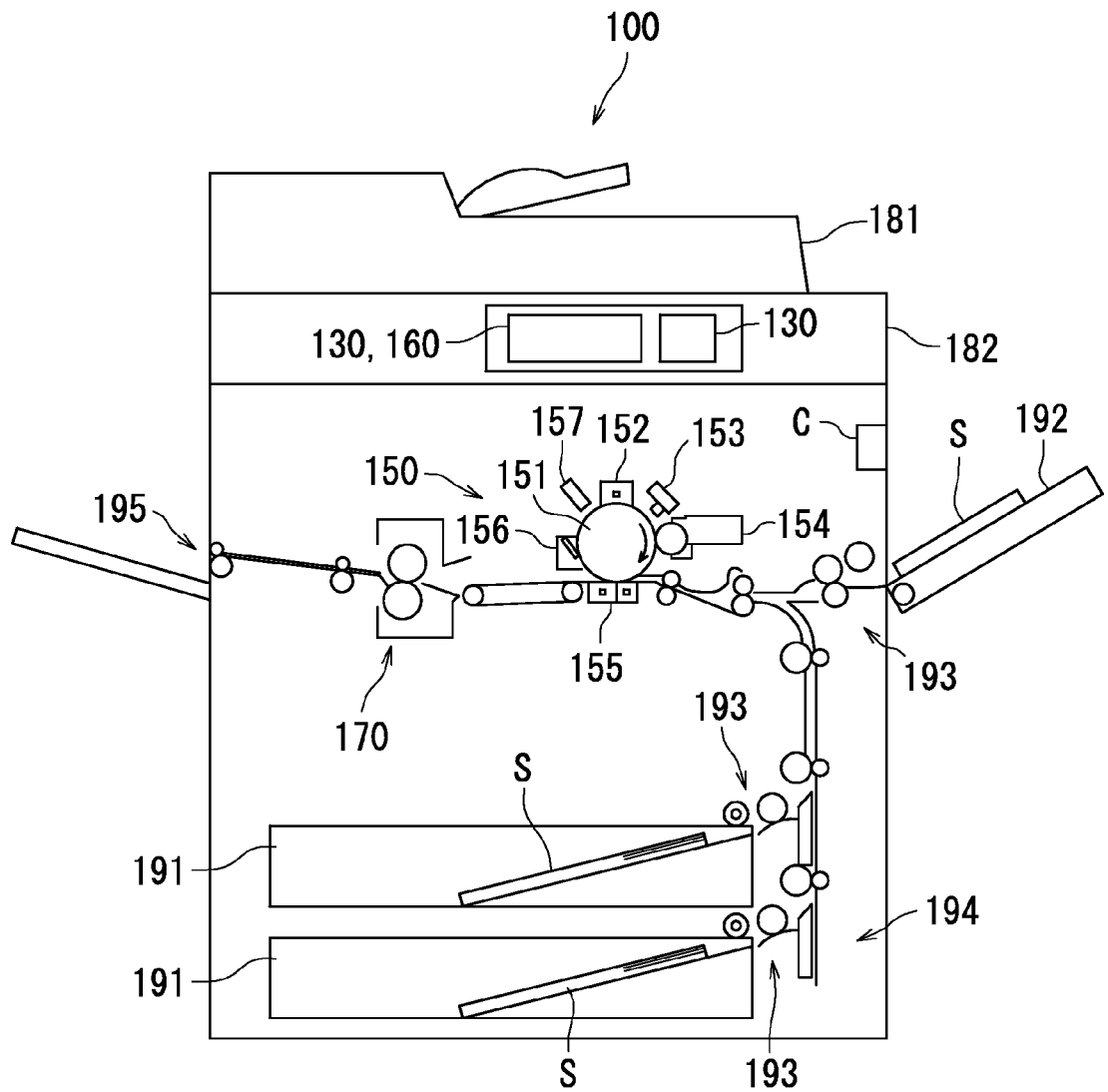
FIG. 10 is a schematic diagram illustrating an image forming apparatus in a printing system according to an embodiment of the present disclosure.

The following explains the image forming apparatus 100 in the printing system 10 according to the present embodiment with reference to FIG. 10. FIG. 10 is a schematic diagram provided in order to facilitate explanation of an overview of the image forming apparatus 100. The image forming apparatus 100 is for example a copier, a printer, a facsimile machine, or a multifunction peripheral. Note that a multifunction peripheral includes at least two devices among a copier, a printer, and a facsimile machine.

The image forming apparatus 100 includes an input section 130, an image forming section 150, a display section 160, a fixing device 170, a document conveyance section 181, an image reading section 182, cassettes 191, a manual feed tray 192, a feed section 193, a conveyance section 194, an ejection section 195, and a control section C.

The control section C controls each element of the image forming apparatus 100. More specifically, the control section C controls the input section 130, the image forming section 150, the display section 160, the fixing device 170, the document conveyance section 181, the image reading section 182, the feed section 193, the conveyance section 194, and the ejection section 195 in accordance with control signals from the input section 130 or a computer program. The control section C includes the interface section 110, the data storage section 120, and the authentication section 140 explained with reference to FIGS. 1-9. The control section C for example further includes a CPU and a storage section. The storage section includes a main storage device (for example, semiconductor memory) and may also include an auxiliary storage device (for example, semiconductor memory or a HDD) depending on specifications.

The input section 130 receives input of input information E. The input section 130 functions as the input section 130 explained with reference to FIGS. 1-9.

The display section 160 displays information. The display section 160 functions as the display section 160 explained with reference to FIGS. 1-9.

The image reading section 182 generates image data by reading an image of a document. The feed section 193 feeds a sheet S loaded in the cassettes 191 or the manual feed tray 192 to the conveyance section 194.

The conveyance section 194 conveys the sheet S to the image forming section 150. The image forming section 150 functions as the image forming section 150 explained with reference to FIGS. 1-9. The image forming section 150 forms an image on the sheet S based on image data. Examples of the image data include image data generated by the image reading section 182 and image data input to the image forming apparatus 100 from an external source. The image forming section 150 forms the image of the sheet S through a photosensitive drum 151, a charger 152, a light exposure section 153, a development section 154, and a transfer section 155. The image forming section 150 further includes a cleaning section 156 and a static eliminating section 157.

The sheet S is conveyed toward the fixing device 170 once the image has been formed thereon. The fixing device 170 fixes the image formed on the sheet S, to the sheet S, by applying heat and pressure to the sheet S. The sheet S is conveyed to the ejection section 195 once the image has been fixed thereto. The ejection section 195 ejects the sheet S.

As explained above, the image forming apparatus 100 illustrated in FIG. 10 forms part of the printing system 10. The image forming apparatus 100 functions as the image forming apparatus 100 explained with reference to FIGS. 1-9. Therefore, the same effects as the image forming apparatus 100 explained with reference to FIGS. 1-9 can be achieved.

Through the above, embodiments of the present disclosure have been explained with reference to the drawings (FIGS. 1-10). However, the present disclosure is not limited to the above embodiments and may be implemented in various different forms that do not deviate from the essence of the present disclosure (for example, as described below in sections (1)-(6)). Elements of configuration disclosed in the above embodiments can be combined as appropriate in various different forms. For example, some of the elements of configuration in the embodiments may be omitted. Furthermore, elements of configuration in different embodiments may be combined as appropriate. The drawings schematically illustrate elements of configuration in order to facilitate understanding. Properties of the elements of configuration illustrated in the drawings such as thickness, length, quantity, and spacing may differ from reality in order to aid preparation of the drawings. Material properties of elements of configuration in the above embodiments are merely examples that do not impose any particular limitations and can be altered in various ways to the extent that there is not substantial deviation from the effects of the present disclosure.

(1) Although only a single specific user has the right to use the terminal device 200 in the printing system 10 explained with reference to FIGS. 1-10, the present disclosure is not limited to such a configuration. For example, a plurality of users may have the right to use a single terminal device 200. In an embodiment in which a plurality of users have the right to use a single terminal device 200, each of the users can be assigned a different user ID.

For example, the data storage section 120 pre-registers an ID list of user IDs and corresponding terminal identification information D. When a user logs in to the terminal device 200, the user inputs a user ID via the input-output section 210. The job generating section 231 generates a print job J that is assigned the terminal identification information D and the user ID. The transceiving section 232 transmits the print job J to the image forming apparatus 100. The data storage section 120 stores the print job J based on the ID list. The user inputs the user ID to the input section 130 as input information E. The authentication section 140 searches for the print job J based on the input information E and the ID list. Through the above, the authentication section 140 positively authenticates the user when the print job J is successfully identified. Therefore, in the embodiment in which the plurality of users use the single terminal device 200, the image forming apparatus 100 can prevent mis-authentication of a user.

(2) Although printing processing in Step S111 and Step S113 is performed after Step S109 in FIG. 2A, the present disclosure is not limited to such a configuration. Alternatively, printing processing in Step S109 can be performed after Step S111 or after Step S113.

(3) Although the specified time is one hour in Step S105 and Step S109 shown in FIGS. 2A, 2B, 3-7, and 8B, the present disclosure is not limited to such a configuration. Depending on the capacity of the non-volatile memory in the image forming apparatus 100, the specified time can be set as longer than one hour. Also, depending on usability, the specified time can be set as shorter than one hour.

(4) Although printing processing in Step S113 is performed after Step S111 in FIG. 2A, the present disclosure is not limited to such a configuration. For example, printing processing in Step S325 shown in FIGS. 5 and 6 can be performed after Step S111 shown in FIG. 2A. Consequently, the image forming apparatus 100 can preferentially print a most recent print job J, and can additionally request the terminal device 200 for a past print job PJ and print the past print job PJ.

(5) Although the printer driver 230 deletes the print job J through a user operation in Steps S523 to S527 shown in FIG. 7, the present disclosure is not limited to such a configuration. For example, the printer driver 230 can automatically delete the print job J in accordance with settings once a certain time elapses from receiving the time out notification signal shown in Step S115. Consequently, it is possible to reduce the burden on the user of operating the input-output section 210.

(6) Although the job list L explained with reference to FIG. 8A indicates file names of a plurality of print jobs J, the present disclosure is not limited to such a configuration. In a situation in which the number of print jobs J assigned the same terminal identification information D is one, the job list L may indicate the file name of one print job J.

What is claimed is:

1. An image forming apparatus communicable with a terminal device and comprising:

an interface section configured to receive, from the terminal device, a print job that is assigned terminal identification information identifying the terminal device;

a data storage section configured to store the print job when the print job is output thereto from the interface section;

an input section configured to receive input of input information;

an authentication section configured to perform user authentication based on the input information; and an image forming section configured to form an image on a sheet based on the print job, wherein in accordance with whether or not the authentication section positively authenticates a user before a specified time elapses from the interface section receiving the print job from the terminal device, the interface section outputs the print job stored by the data storage section to the image forming section or the terminal device, and the data storage section deletes the print job stored, and in a situation in which the authentication section positively authenticates the user after the specified time elapses from the interface section receiving the print job from the terminal device, the interface section transmits a job request signal to the terminal device in order to request the print job, receives the print job when the print job is transmitted from the terminal device in response to the job request signal, and outputs the print job to the data storage section, wherein the interface section transmits a job confirmation signal to the terminal device in order to confirm presence of the print job and transmits the job request signal to the terminal device in accordance with a confirmation result of the job confirmation signal, the data storage section stores the print job, the interface section outputs the print job stored by the data storage section to the image forming section, the image forming section forms the image on the sheet based on the print job, and the data storage section deletes the print job stored.

2. The image forming apparatus according to claim 1, wherein in a situation in which the authentication section positively authenticates the user before the specified time elapses from the interface section receiving the print job from the terminal device, the interface section outputs the print job stored by the data storage section to the image forming section, and the image forming section forms the image on the sheet based on the print job, and in a situation in which the authentication section does not positively authenticate the user before the specified time elapses from the interface section receiving the print job from the terminal device, the interface section transmits the print job stored by the storage section to the terminal device.

3. An image forming apparatus communicable with a terminal device and comprising:

an interface section configured to receive, from the terminal device, a print job that is assigned terminal identification information identifying the terminal device;

a data storage section configured to store the print job when the print job is output thereto from the interface section;

an input section configured to receive input of input information;

an authentication section configured to perform user authentication based on the input information; and an image forming section configured to form an image on a sheet based on the print wherein in accordance with whether or not the authentication section positively authenticates a user before a specified time elapses from the interface section receiving the print job from the terminal device, the interface section outputs the print job stored by the data storage section to the image forming section or the terminal device, and the data storage section deletes the print job stored, after the authentication section positively authenticates the user, the interface section transmits a job request signal to the terminal device in order to request a past print job, and the interface section transmits a job confirmation signal to the terminal device in order to confirm presence of the past print job and transmits the job request signal to the terminal device in accordance with a confirmation result of the job confirmation signal.

4. The image forming apparatus according to claim 1, further comprising a display section, wherein after the authentication section positively authenticates the user, the interface section transmits a list request signal to the terminal device in order to request a job list that identifies the print job, the interface section receives the job list from the terminal device, the display section displays the job list received by the interface section, and the interface section transmits the job request signal to the terminal device.

5. The image forming section according to claim 1, wherein the input section is a card reader that is configured to read the input information from a card.

6. An image forming method implemented by an image forming apparatus that is communicable with a terminal device and that includes an interface section, a data storage section, an input section, an authentication section, and an image forming section that forms an image on a sheet, the image forming method comprising:

receiving, by the interface section, of a print job that is transmitted from the terminal device and that is assigned terminal identification information identifying the terminal device;

outputting, by the interface section, of the print job received from the terminal device to the data storage section;

storing, by the data storage section, of the print job output from the interface section;

receiving, by the input section, of input information that is input by a user;

in accordance with whether or not the authentication section positively authenticates the user based on the input information before a specified time elapses from the interface section receiving the print job from the terminal device, outputting, by the interface section, of the print job stored by the storage section to the image forming section or the terminal device, and deleting, by the data storage section, of the print job stored; and in a situation in which the authentication section positively authenticates the user based on the input information after the specified time elapses from the interface section receiving the print job from the terminal device, causing the interface section to transmit a job request signal to the terminal device in order to request the print job, wherein the interface section transmits a job confirmation signal to the terminal device in order to confirm presence of the print job and transmits the job request signal to the terminal device in accordance with a confirmation result of the job confirmation signal, receive the print job when the print job is transmitted from the terminal device in response to the job request signal, and output the print job to the data storage section, causing the data storage section to store the print job, causing the interface section to output the print job stored by the data storage section to the image forming section, causing the image forming section to form the image on the sheet based on the print job, and causing the data storage section to delete the print job stored.

7. A printing system comprising:

a terminal device; and an image forming apparatus communicable with the terminal device, wherein the image forming apparatus includes an interface section, a data storage section, an input section, an authentication section, and an image forming section that forms an image on a sheet based on a print job, the print job is assigned terminal identification information that identifies the terminal device, the terminal device transmits the print job to the interface section, the interface section outputs, to the data storage section, the print job transmitted from the terminal device, the data storage section stores the print job output from the interface section the input section receives input information input by a user, in accordance with whether or not the authentication section positively authenticates the user before a specified time elapses from the interface section receiving the print job from the terminal device, the interface section outputs the print job stored by the data storage section to the image forming section or the terminal device, and the data storage section deletes the print job stored, the terminal device includes an input-output section that is user operable, a storage section, and a printer driver that is compatible with the image forming apparatus, the printer driver includes a job generating section that generates the print job based on document information and a transceiving section that performs print job transmission and reception with the interface section, the transceiving section transmits the print job to the interface section in response to an operation performed by the user via the input-output section, the interface section outputs, to the data storage section, the print job transmitted from the transceiving section, in a situation in which the authentication section positively authenticates the user based on the input information before the specified time elapses from the interface section receiving the print job from the terminal device, the interface section outputs the print job stored by the data storage section to the image forming section, and the image forming section forms the image on the sheet based on the print job, in a situation in which the authentication section does not positively authenticate the user based on the input information before the specified time elapses from the interface section receiving the print job from the terminal device, the interface section transmits the print job stored by the data storage section to the transceiving section, and the storage section stores the print job received from the interface section via the transceiving section, and in a situation in which the authentication section positively authenticates the user based on the input information after the specified time elapses from the interface section receiving the print job from the transceiving section, the interface section transmits a job request signal to the transceiving section in order to request the print job stored by the storage section, wherein the interface section transmits a job confirmation signal to the terminal device in order to confirm presence of the print job and transmits the job request signal to the terminal device in accordance with a confirmation result of the job confirmation signal, the transceiving section transmits the print job to the interface section in response to the job request signal, the interface section outputs, to the data storage section, the print job transmitted from the transceiving section, the data storage section stores the print job output from the interface section, the interface section outputs, to the image forming section, the print job transmitted from the transceiving section, the image forming section forms the image on the sheet based on the print job output from the interface section, and the data storage section deletes the print job stored.

8. A printing system comprising:
a terminal device; and
an image forming apparatus communicable with the terminal device, wherein
the image forming apparatus includes an interface section, a data storage section, an input section, an authentication section, and an image forming section that forms an image on a sheet based on a print job,
the print job is assigned terminal identification information that identifies the terminal device,
the terminal device transmits the print job to the interface section,
the interface section outputs, to the data storage section, the print job transmitted from the terminal device,
the data storage section stores the print job output from the interface section
the input section receives input information input by a user, in accordance with whether or not the authentication section positively authenticates the user before a specified time elapses from the interface section receiving the print job from the terminal device, the interface section outputs the print job stored by the data storage section to the image forming section or the terminal device, and the data storage section deletes the print job stored, the terminal device includes an input-output section that is user operable, a storage section, and a printer driver that is compatible with the image forming apparatus, the printer driver includes a job generating section that generates the print job based on document information and a transceiving section that performs print job transmission and reception with the interface section, the transceiving section transmits the print job to the interface section in response to an operation performed by the user via the input-output section, the interface section outputs, to the data storage section, the print job transmitted from the transceiving section, in a situation in which the authentication section positively authenticates the user based on the input information before the specified time elapses from the interface section receiving the print job from the terminal device, the interface section outputs the print job stored by the data storage section to the image forming section, and the image forming section forms the image on the sheet based on the print job, in a situation in which the authentication section does not positively authenticate the user based on the input information before the specified time elapses from the interface section receiving the print job from the terminal device, the interface section transmits the print job stored by the data storage section to the transceiving section, and the storage section stores the print job received from the interface section via the transceiving section, after the storage section stores the print job output from the interface section, the printer driver makes a user enquiry, via the input-output section, of whether or not to delete the print job, the input-output section outputs a signal for deletion of the print job to the storage section, and the storage section deletes the print job stored, in response to the signal output from the input-output section.

* * * * *